Patented Nov. 2, 1943

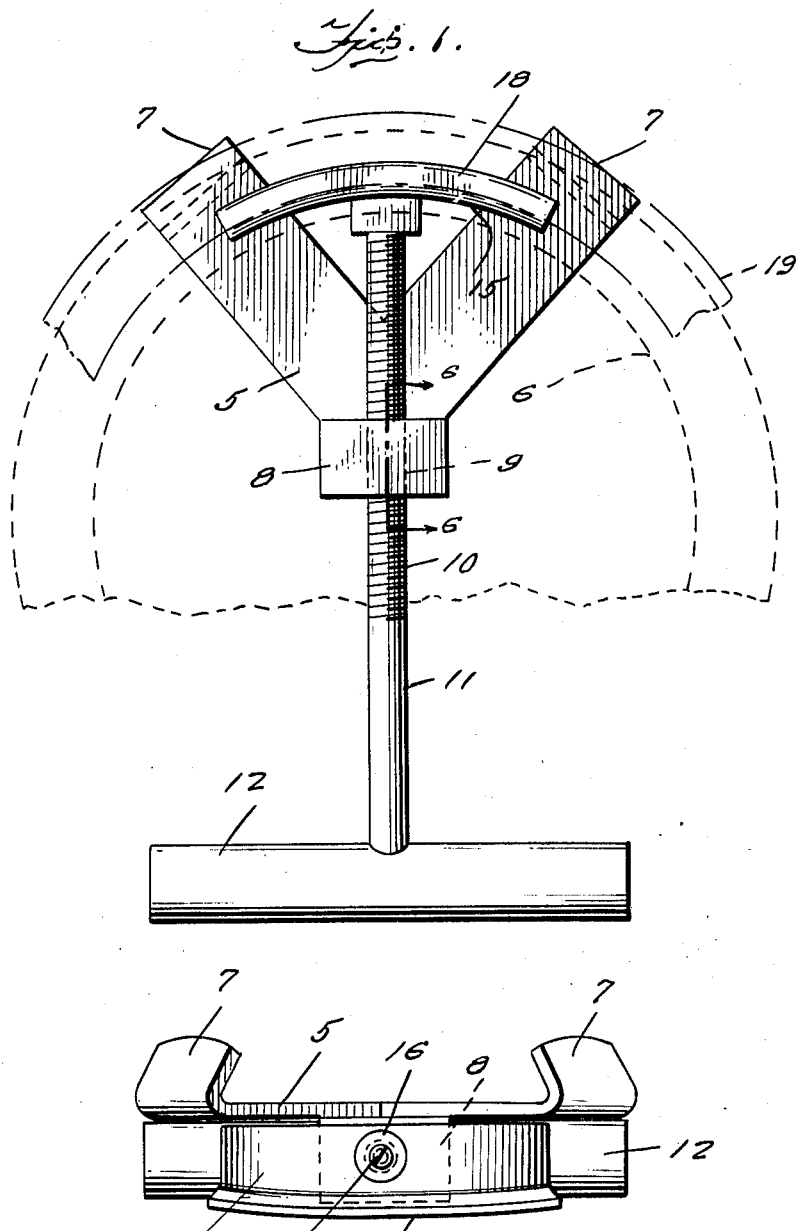

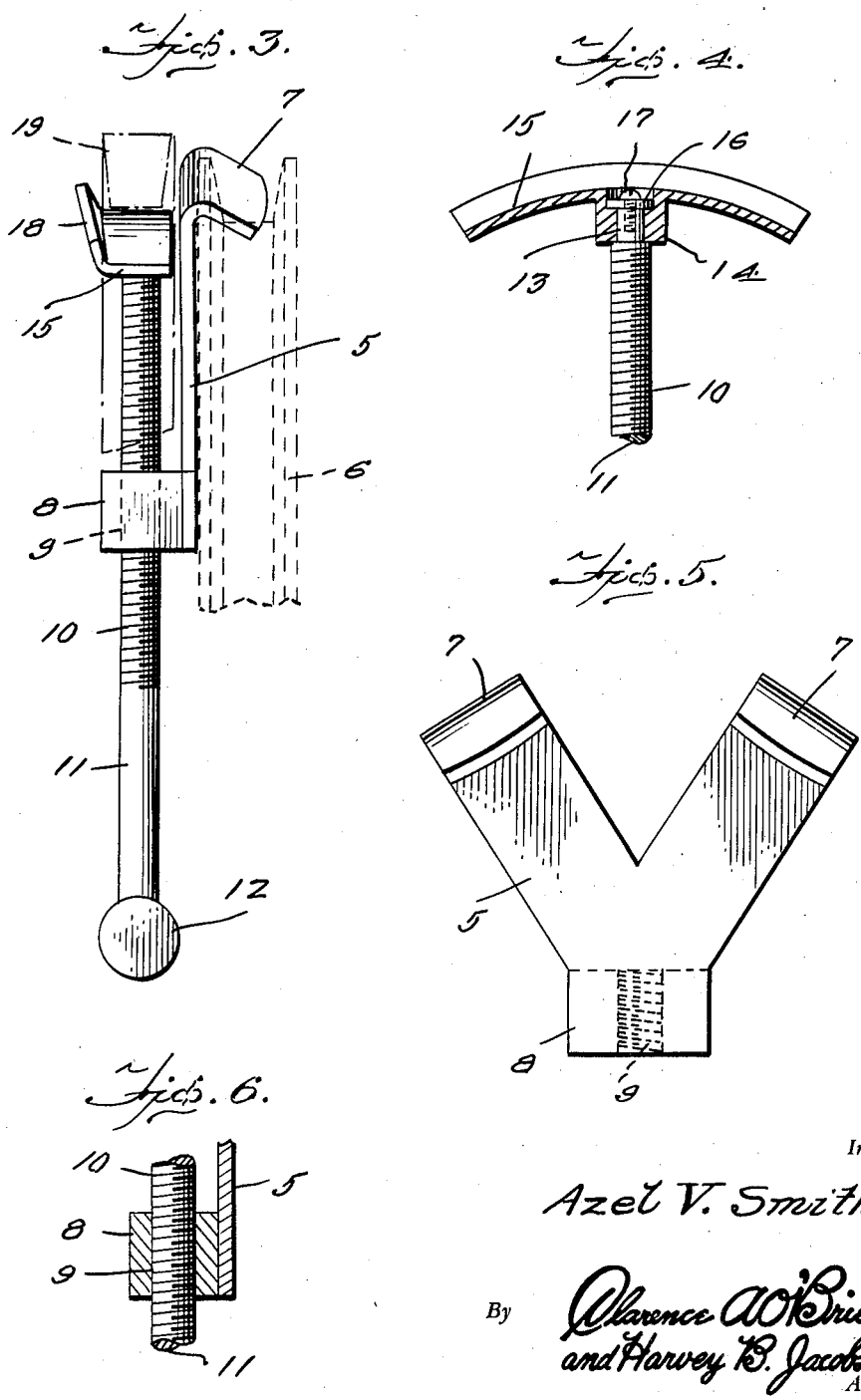

2,333,395

UNITED STATES PATENT OFFICE 2,333,395

FAN BELT TOOL

Azel V. Smith, Des Moines, Iowa

Application August 4, 1942, Serial No. 453,603

3 Claims. (Cl. 74—242.7)

This invention relates to new and useful improvements in tools or implements whereby belts can be applied to pulleys.

The present invention relates more particularly to a tool for applying belts to circumferentially grooved pulleys such as fan belt pulleys.

The principal object of the present invention is to provide a tool of simple construction and capable of being easily operated for placement of drive belts with practically no likelihood of damage to the belt while being applied.

Other important objects and advantages of the invention will become apparent to the reader of the following description.

In the drawings:

Figure 1 represents a side elevational view of the tool showing a pulley and a portion of a belt in broken lines.

Figure 2 is a top plan view of the tool.

Figure 3 is an edge elevational view of the tool.

Figure 4 is a fragmentary sectional view through the saddle portion of the tool.

Figure 5 is a side elevational view of the hook structure.

Figure 6 is a sectional view taken substantially on the line 6—6 of Figure 1.

Referring to the drawings wherein like numerals designate like parts, it can be seen that the tool consists of a V-shaped plate denoted by numeral 5 and which forms part of a hook structure for engaging a circumferentially grooved pulley 6.

The upstanding leg portions of the plate 5 have backwardly slanting or oblique lip portions 7 for disposition over one flange of a grooved wheel 6 in the manner shown in Figure 3.

The lower portion of the plate 5 has a block 8 suitably secured thereto and through this block 8 is a threaded bore 9 for receiving the threaded portion 10 of an elongated shaft 11, this shaft having a hand bar or head 12 at one end while its other end is reduced as at 13 for disposition in a bore of a boss 14 depending from a saddle 15. This end portion of the shaft 11 is equipped with a washer 16 and a retaining screw 17 so that this end of the shaft 11 is swivelly connected with the boss 14.

The saddle blade 15 is of arcuate shape and has a side flange 18 at its edge portion opposite from its edge portion opposed to the plate 5 so as to prevent displacement of a belt 19 therefrom.

It can now be seen that considering the position of the tool shown in Figure 1, the saddle 15 can be lowered to the desired point and a belt 19 slipped thereover, this is after the lip members 7, 7 have been engaged over the flange of the pulley 6. By now rotating the shaft 11, the saddle 15 can be fed toward the periphery of the pulley and when the belt has reached a point coincidal with the periphery of the pulley 6, an outward pull on the shaft 11 will result in the belt being shifted off of the saddle 15 and into the groove of the pulley 6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A belt tool of the character described comprising a belt supporting saddle, a pulley engageable structure, a screw shaft feedable through a portion of the supporting structure, means for rotating the shaft and a swiveled connection between the shaft and the saddle, said supporting structure being provided with a pulley groove entering lip and being constructed and arranged to fulcrum on a side portion of the pulley when it is desired to shift a belt into the groove of a pulley.

2. A belt tool of the character described comprising a belt supporting saddle, a pulley engageable structure, a screw shaft feedable through a portion of the supporting structure, means for rotating the shaft and a swiveled connection between the shaft and the saddle, said supporting structure being in the form of a V-shaped plate having a threaded opening at its lower portion for receiving the shaft and backwardly slanting lip portion at its upper end for engaging over and into the peripheral portion of a grooved pulley wheel.

3. A belt tool comprising a plate provided with a nut at one end thereof, a hook formation at the other end of the plate, a screw shaft feedable through the nut and provided with a handle at one end thereof, a flanged saddle at the opposite end of the screw shaft and to which the screw shaft is swivelly connected.

AZEL V. SMITH.